(12) United States Patent
Adibhatla

(10) Patent No.: US 10,604,278 B2
(45) Date of Patent: Mar. 31, 2020

(54) METHODS AND APPARATUS TO MONITOR HEALTH INFORMATION OF A TURBINE ENGINE

(71) Applicant: General Electric Company, Schenectady, NY (US)

(72) Inventor: Sridhar Adibhatla, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 299 days.

(21) Appl. No.: 15/490,524

(22) Filed: Apr. 18, 2017

(65) Prior Publication Data

US 2018/0297718 A1     Oct. 18, 2018

(51) Int. Cl.
| | | |
|---|---|---|
| G01M 17/00 | (2006.01) | |
| B64F 5/60 | (2017.01) | |
| B64D 45/00 | (2006.01) | |
| G07C 5/00 | (2006.01) | |
| G07C 5/08 | (2006.01) | |
| F01D 21/14 | (2006.01) | |

(52) U.S. Cl.
CPC .............. *B64F 5/60* (2017.01); *B64D 45/00* (2013.01); *F01D 21/14* (2013.01); *G07C 5/006* (2013.01); *G07C 5/008* (2013.01); *G07C 5/085* (2013.01); *G07C 5/0808* (2013.01); *G07C 5/0816* (2013.01); *B64D 2045/0085* (2013.01); *F05D 2260/80* (2013.01); *F05D 2260/81* (2013.01); *F05D 2270/112* (2013.01); *F05D 2270/301* (2013.01); *F05D 2270/303* (2013.01); *F05D 2270/304* (2013.01); *F05D 2270/71* (2013.01)

(58) Field of Classification Search
CPC .......... B64F 5/60; F01D 21/14; G07C 5/085; G07C 5/0808; G07C 5/006; G07C 5/008; G07C 5/0816; B64D 45/00; B64D 2045/0085; F05D 2270/112; F05D 2270/303; F05D 2270/304; F05D 2270/71; F05D 2260/81; F05D 2270/301; F05D 2260/80
USPC ................. 701/33.9, 29.6, 3, 33, 32.9, 33.4; 73/112.01
See application file for complete search history.

(56) References Cited

U.S. PATENT DOCUMENTS 6,463,380 B1   10/2002 Ablett et al.
9,458,735 B1 * 10/2016 Diwinsky .............. F01D 21/003
(Continued)

*Primary Examiner* — Shardul D Patel
(74) *Attorney, Agent, or Firm* — Wood IP LLC

(57) ABSTRACT

An example apparatus includes a parameter calculator to determine a baseline value of a set of health parameters for a turbine engine of a vehicle based on a first set of sensor measurements to estimate an initial health of turbine engine components, and determine an operational value of the set of health parameters based on a second set of sensor measurements to estimate an operational health of the turbine engine components. The apparatus further includes a difference calculator to calculate a difference between the baseline value and the operational value to assess a health of the turbine engine, a database to store the first set of sensor measurements or the initial health of the turbine engine components, and an alert generator to generate an alert when the difference satisfies a threshold, the alert including a notification to perform maintenance on the component based on the difference and the threshold.

20 Claims, 9 Drawing Sheets

(56) References Cited

U.S. PATENT DOCUMENTS

| | | | | |
|---|---|---|---|---|
| 2007/0214796 A1* | 9/2007 | Bland | ................... | F01D 21/003 60/772 |
| 2010/0268403 A1* | 10/2010 | Poisson | ............. | G05B 23/0213 701/3 |
| 2012/0324987 A1* | 12/2012 | Khibnik | ............. | G01N 15/0266 73/112.01 |
| 2012/0330495 A1* | 12/2012 | Geib | ................... | F01D 21/003 701/29.6 |
| 2014/0358398 A1* | 12/2014 | Brunschwig | ......... | G01M 15/14 701/100 |
| 2015/0027100 A1* | 1/2015 | Qin | ........................ | F02O 7/228 60/39.091 |
| 2016/0305336 A1* | 10/2016 | Okada | ...................... | F02C 9/18 |
| 2016/0342154 A1* | 11/2016 | Panov | ............... | G05B 23/0221 |
| 2017/0115183 A1* | 4/2017 | Bianchi | ................ | G01F 15/18 |
| 2017/0146976 A1* | 5/2017 | Volponi | .............. | G05B 19/406 |
| 2017/0204736 A1* | 7/2017 | Varney | .................. | F01D 11/24 |
| 2017/0204744 A1* | 7/2017 | Varney | ................. | F01D 25/246 |

* cited by examiner

FLIGHT BINS OF A TURBINE ENGINE

| -2000 – 10000 FEET<br>0 – 0.6 MACH<br>70 – 80 %N1<br>FLIGHT BIN 0 | -2000 – 10000 FEET<br>0 – 0.6 MACH<br>80 – 85 %N1<br>FLIGHT BIN 1 | -2000 – 10000 FEET<br>0 – 0.6 MACH<br>85 – 90 %N1<br>FLIGHT BIN 2 | -2000 – 10000 FEET<br>0 – 0.6 MACH<br>90 – 100 %N1<br>FLIGHT BIN 3 |
|---|---|---|---|
| 10000 – 20000 FEET<br>0.3 – 0.8 MACH<br>70 – 80 %N1<br>FLIGHT BIN 4 | 10000 – 20000 FEET<br>0.3 – 0.8 MACH<br>80 – 85 %N1<br>FLIGHT BIN 5 | 10000 – 20000 FEET<br>0.3 – 0.8 MACH<br>85 – 90 %N1<br>FLIGHT BIN 6 | 10000 – 20000 FEET<br>0.3 – 0.8 MACH<br>90 – 100 %N1<br>FLIGHT BIN 7 |
| 20000 – 29000 FEET<br>0.4 – 0.9 MACH<br>70 – 80 %N1<br>FLIGHT BIN 8 | 20000 – 29000 FEET<br>0.4 – 0.9 MACH<br>80 – 85 %N1<br>FLIGHT BIN 9 | 20000 – 29000 FEET<br>0.4 – 0.9 MACH<br>85 – 90 %N1<br>FLIGHT BIN 10 | 20000 – 29000 FEET<br>0.4 – 0.9 MACH<br>90 – 100 %N1<br>FLIGHT BIN 11 |
| 29000 – 36000 FEET<br>0.5 – 0.9 MACH<br>70 – 80 %N1<br>FLIGHT BIN 12 | 29000 – 36000 FEET<br>0.5 – 0.9 MACH<br>80 – 85 %N1<br>FLIGHT BIN 13 | 29000 – 36000 FEET<br>0.5 – 0.9 MACH<br>85 – 90 %N1<br>FLIGHT BIN 14 | 29000 – 36000 FEET<br>0.5 – 0.9 MACH<br>90 – 100 %N1<br>FLIGHT BIN 15 |
| 36000 – 41000 FEET<br>0.6 – 0.9 MACH<br>70 – 80 %N1<br>FLIGHT BIN 16 | 36000 – 41000 FEET<br>0.6 – 0.9 MACH<br>80 – 85 %N1<br>FLIGHT BIN 17 | 36000 – 41000 FEET<br>0.6 – 0.9 MACH<br>85 – 90 %N1<br>FLIGHT BIN 18 | 36000 – 41000 FEET<br>0.6 – 0.9 MACH<br>90 – 100 %N1<br>FLIGHT BIN 19 |

FIG. 4

METHODS AND APPARATUS TO MONITOR HEALTH INFORMATION OF A TURBINE ENGINE

RELATED GOVERNMENT CONTRACT

This invention was made with Government support under contract number DTFAWA-10-C-00046 awarded by the Federal Aviation Administration. The government has certain rights in this invention.

FIELD OF THE DISCLOSURE

This disclosure relates generally to turbine engines and, more particularly, to methods and apparatus to monitor health information of a turbine engine.

BACKGROUND

In recent years, turbine engines have been increasingly utilized in a variety of applications and fields. Turbine engines are intricate machines with extensive availability, reliability, and serviceability requirements. Traditionally, maintaining turbine engines incur steep costs. Costs generally include having exceptionally skilled and trained maintenance personnel service the turbine engines. In some instances, costs are driven by replacing expensive components or by repairing complex sub-assemblies.

The pursuit of increasing turbine engine availability while reducing premature maintenance costs requires enhanced insight. Such insight is needed to determine when to perform typical maintenance tasks at generally appropriate service intervals. Traditionally, availability, reliability, and serviceability increase as enhanced insight is deployed.

BRIEF DESCRIPTION OF THE DRAWINGS

FIG. 4 is an example table depicting example flight bins of the example gas turbine engine of FIG. 1.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

SUMMARY

Figure 1:
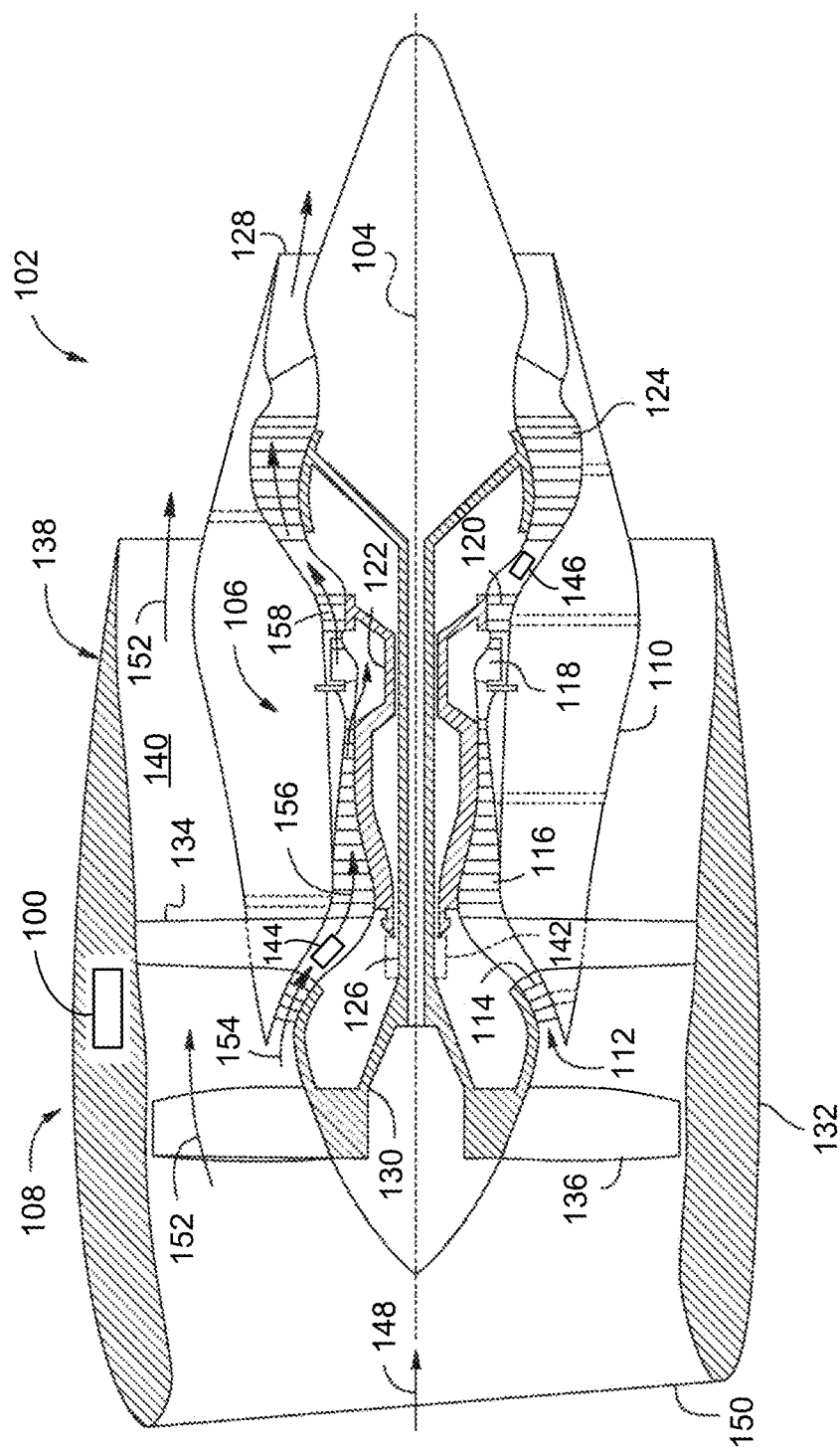
FIG. 1 illustrates an example gas turbine engine that can be utilized within an aircraft in which the examples disclosed herein can be implemented.

Methods, apparatus, and articles of manufacture to monitor health information of a turbine engine are disclosed.

Certain examples provide an example apparatus for monitoring health information of a turbine engine. The example apparatus includes a parameter calculator to determine a baseline value of a set of health parameters for a turbine engine of a vehicle based on a first set of sensor measurements to estimate an initial health of turbine engine components, and determine an operational value of the set of health parameters based on a second set of sensor measurements to estimate an operational health of the turbine engine components. The apparatus further includes a difference calculator to calculate a difference between the baseline value and the operational value to assess a health of the turbine engine, a database to store the first set of sensor measurements or the initial health of the turbine engine components, and an alert generator to generate an alert when the difference satisfies a threshold, the alert including a notification to perform maintenance on the component based on the difference and the threshold.

Certain examples provide an example method for monitoring health information of a turbine engine. The example method includes determining a baseline value of a set of health parameters for a turbine engine of a vehicle based on a first set of sensor measurements to estimate an initial health of turbine engine components, determining an operational value of the set of health parameters based on a second set of sensor measurements to estimate an operational health of the turbine engine components, calculating a difference between the baseline value and the operational value to assess a health of the turbine engine, storing the first set of sensor measurements or the initial health of the turbine engine components, and generating an alert when the difference satisfies a threshold, the alert including a notification to perform maintenance on the component based on the difference and the threshold.

Certain examples provide an example tangible computer-readable storage medium comprising instructions that, when executed, cause a machine to at least monitor health information of a turbine engine. The example instructions, when executed, cause the machine to at least determine a baseline value of a set of health parameters for a turbine engine of a vehicle based on a first set of sensor measurements to estimate an initial health of turbine engine components, determine an operational value of the set of health parameters based on a second set of sensor measurements to estimate an operational health of the turbine engine components, calculate a difference between the baseline value and the operational value to assess a health of the turbine engine, store the first set of sensor measurements or the initial health of the turbine engine components, and generate an alert when the difference satisfies a threshold, the alert including a notification to perform maintenance on the component based on the difference and the threshold.

DETAILED DESCRIPTION

A turbine engine, also called a combustion turbine or a gas turbine, is a type of internal combustion engine. Turbine engines are commonly utilized in aircraft and power-generation applications. As used herein, the terms "aircraft turbine engine," "gas turbine," "land-based turbine engine," and "turbine engine" are used interchangeably. A basic operation of the turbine engine includes an intake of fresh atmospheric air flow through the front of the turbine engine with a fan. In some examples, the air flow travels through an intermedia-pressure compressor or a booster compressor located between the fan and a high-pressure compressor. The booster compressor is used to supercharge or boost the pressure of the air flow prior to the air flow entering the high-pressure compressor. The air flow can then travel through the high-pressure compressor that further pressurizes the air flow. The high-pressure compressor includes a group of blades attached to a shaft. The blades spin at high speed and subsequently compress the air flow. The high-pressure compressor then feeds the pressurized air flow to a combustion chamber. In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow.

In the combustion chamber of the turbine engine, the fuel is ignited with an electric spark provided by an igniter, where the fuel in some examples burns at temperatures of more than 2000 degrees Fahrenheit. The resulting combustion produces a high-temperature, high-pressure gas stream (e.g., hot combustion gas) that passes through another group of blades called a turbine. In some examples, the turbine includes an intricate array of alternating rotating and stationary airfoil-section blades. As the hot combustion gas passes through the turbine, the hot combustion gas expands, causing the rotating blades to spin. The rotating blades serve at least two purposes. A first purpose of the rotating blades is to drive the booster compressor and/or the high-pressure compressor to draw more pressured air into the combustion chamber. For example, the turbine is attached to the same shaft as the high-pressure compressor in a direct-drive configuration, thus, the spinning of the turbine causes the high-pressure compressor to spin. A second purpose of the rotating blades is to spin a generator operatively coupled to the turbine section to produce electricity. For example, the turbine can generate electricity to be used by an aircraft, a power station, etc.

In the example of an aircraft turbine engine, after passing through the turbine, the hot combustion gas exits the aircraft turbine engine through a nozzle at the back of the aircraft turbine engine. As the hot combustion gas exits the nozzle, the aircraft turbine engine and the corresponding aircraft coupled to the aircraft turbine engine are accelerated forward (e.g., thrusted forward). In the example of a land-based turbine engine, after passing through the turbine, the hot combustion gas is dissipated, used to generate steam, etc.

A turbine engine (e.g., an aircraft turbine engine) typically includes components for operation such as a fan (e.g., a fan section), a booster compressor, a high-pressure compressor, a high-pressure turbine, and a low-pressure turbine. The components can degrade over time due to demanding operating conditions such as extreme temperature and vibration. In some instances, debris or other objects enter the turbine engine via the fan and cause damage to one or more components. Routine maintenance intervals and service checks can be implemented to inspect for degradation and/or damage. However, in some instances, taking the turbine engine offline to perform maintenance includes taking an entire system, such as an aircraft, offline. In addition to prematurely replacing expensive components, aircraft non-operation can incur additional costs such as lost revenue, labor costs, etc. Monitoring components for degradation can provide actionable information for maintenance personnel to replace a component of the turbine engine when necessary. In some examples, monitoring components can provide actionable information to a control system to proficiently control the turbine engine to improve system efficiency, sustain turbine engine health, extend maintenance period intervals, etc.

Example turbine engine health monitor (TEHM) apparatus disclosed herein relate to turbine engines and, more specifically, to monitoring health information of a turbine engine. Disclosed examples herein perform prognostic health monitoring of components of a turbine engine and, more generally, the turbine engine assembly. As used herein, the term "prognostic health monitoring" (PHM) refers to monitoring one or more components of an assembly, detecting a condition (state) of the components, and calculating a health parameter indicating a measure of operational health based on the state. In some examples, PHM is used to perform system and/or fleet level analysis based on component-level diagnostics. For example, data obtained and analyzed for a turbine engine of an aircraft can be used to calculate reliability probabilities for similar turbine engines of similar aircraft. In some instances, PHM is used to determine maintenance or service intervals of a turbine engine component and/or a turbine engine assembly based on a condition of the turbine engine component and/or the turbine engine assembly.

In general, the example TEHM apparatus disclosed herein utilizes a controller to obtain information from sensing devices such as gas path sensors to determine health parameters for components. In some examples, the controller is an engine control unit (ECU), an electronic engine control (EEC) unit, a full-authority digital engine control (FADEC) unit, etc. The controller can utilize a model that simulates a turbine engine. For example, a model of a turbine engine can form a digital twin of the turbine engine, allowing simulation, viewing, and other modeling of the components of the turbine engine and their behavior under different environmental configuration and stimuli. For example, the controller can use a look-up table model, a curve-fit (regression) model, and/or a physics-based model (e.g., an aero-thermodynamic model). The model characterizes the turbine engine by estimating outputs based on inputs. For example, the model inputs can include actuator positions. In another example, the model inputs can include ambient conditions based on an altitude, a Mach number, and a day temperature of the turbine engine. The model outputs can include processed sensor data (e.g., estimates of sensor data based on unfiltered and/or unprocessed sensor data), performance parameters such as thrust and stall margins, etc.

Some example TEHM apparatus disclosed herein utilize a model that implements a tracking filter. The example TEHM apparatus can utilize the tracking filter to estimate an effect of component deterioration, sensor biases, turbine engine-to-turbine engine variations, etc. In some examples, the tracking filter is a classical observer, an inverse Jacobian tracking filter, a least-squares tracking filter, a Kalman Filter (optimal observer), etc. The example TEHM apparatus can utilize the model and sensor outputs to obtain, track, and analyze sensor data and sensor data trends over time to determine differences between (1) model outputs, sensor outputs, etc., obtained and/or calculated during a calibration (e.g., an initial) process, and (2) model outputs, sensor outputs, etc., obtained and/or calculated during an operational process.

In some disclosed examples, the tracking filter is a parameter identification algorithm that tunes one or more parameters (e.g., health parameters) in the model to adjust model outputs to match sensor outputs. For example, the TEHM apparatus can obtain sensor data (e.g., an analog signal such as a current, a resistance, or a voltage) from a turbine engine sensor. For example, the turbine engine sensor can measure a speed of a rotor, a pressure, a temperature, etc. The example TEHM apparatus can convert or scale the sensor data to yield a sensor output in engineering units such as rpm, psi, or degrees Rankine. The example TEHM apparatus can calculate a model output, where the model output is an estimate value for the sensor output based on a set of operating conditions or parameters of the turbine engine in the model. The example TEHM apparatus can compare the model output to the sensor output to determine a difference. The example TEHM apparatus can adjust one or more health parameters of the model to eliminate or minimize the difference.

Some example TEHM apparatus disclosed herein utilize a model to determine one or more health parameters for a turbine engine. As used herein, the term "health parameter" refers to an indicator of component and/or assembly condition or health. A condition or a health indicator can be a degradation quantifier (e.g., a percentage of operational use remaining), an efficiency quantifier (e.g., a ratio of an input to a system to an output of the system), a time quantifier (e.g., operating time remaining until a component is due for service), etc. A condition or a health indicator can be compared against a threshold to determine an action or an alert. For example, a health indicator of a fan can include an efficiency percentage of 75%, whereby if the efficiency percentage falls below 73%, then the example TEHM apparatus can generate an alert that the fan may need servicing.

In some examples, the TEHM apparatus calculates values for one or more health parameters of a turbine engine. Example health parameters include an efficiency modifier (e.g., an efficiency adder), a flow modifier (e.g., a flow scalar), etc., for each of the components of the turbine engine. For example, the components can be rotating components such as a fan, a booster compressor, a high-pressure compressor, a high-pressure turbine, a low-pressure turbine, etc. In some instances, the TEHM apparatus calculates values for health parameters that include cooling flows, bleeds, pressure losses, clearance or nozzle area changes, etc.

As used herein, the terms "efficiency modifier" and "efficiency adder" refer to a scalar parameter used to determine an actual efficiency (e.g., an actual turbine engine efficiency) of a turbine engine based on a baseline (nominal) efficiency for the turbine engine, and the terms are used interchangeably. The example TEHM apparatus can determine a baseline efficiency by mapping one or more parameters such as a turbine engine speed, a pressure ratio, etc., to the baseline efficiency in a look-up table. For example, the TEHM apparatus can determine the baseline efficiency to be 88% based on the turbine engine operating at 25,000 feet and 0.62 Mach. The example TEHM apparatus can determine the actual efficiency by modifying one or more parameters of a turbine engine model to make a model output match a sensor output. For example, the TEHM apparatus can adjust the baseline efficiency modifier from 88% to 87% to make a first turbine engine exhaust temperature based on a turbine engine model output match a second turbine engine exhaust temperature based on a sensor output. The example TEHM apparatus can determine the efficiency modifier to be 1% (e.g., 88%-87%=1%) based on adjusting the baseline efficiency modifier to make the model output match the sensor output.

In some examples, the TEHM apparatus determines a correction factor based on calculating a difference between a model output and a sensor output during a calibration process (e.g., a first flight) of a turbine engine. For example, the TEHM apparatus can calculate adjusted operational sensor data by offsetting operational sensor data with the correction factor. By calculating adjusted operational sensor data, the example TEHM apparatus can reduce or eliminate model error, sensor bias, etc., when using sensor data to calculate health parameters. For example, the TEHM apparatus can compare the adjusted operational sensor data to baseline sensor data to determine a difference more accurately between (1) turbine engine operation during a first flight, and (2) turbine engine operation during subsequent flights. In another example, the TEHM apparatus can determine changes in turbine engine operation or performance over time with more accuracy by calculating operational health parameters based on adjusted operational sensor data.

As used herein, the terms "flow modifier" and "flow scalar" refer to a scalar parameter used to determine an actual flow rate based on a baseline (nominal) flow rate, where the flow rate refers to air flow or gas flow through a turbine engine, and the terms are used interchangeably. The example TEHM apparatus can determine a baseline flow rate by mapping one or more parameters such as a turbine engine speed, a pressure ratio, etc., to the baseline flow rate in a look-up table. For example, the TEHM apparatus can determine the baseline flow rate to be 100 pounds per second (lb/s) based on the turbine engine operating at 25,000 feet and 0.62 Mach. The example TEHM apparatus can determine the actual flow rate by modifying one or more parameters of a turbine engine model to make a model output match a sensor output. For example, the TEHM apparatus can adjust the baseline flow rate from 100 lb/s to 101 lb/s to make a first turbine engine gas flow rate based on a turbine engine model output match a second turbine engine gas flow rate based on a sensor output. The example TEHM apparatus can determine the flow modifier by dividing the actual flow rate by the baseline flow rate. For example, the TEHM apparatus can determine the flow modifier to be 1.01 (e.g., 101 lb/s divided by 100 lbs/s=1.01).

Some example TEHM apparatus disclosed herein obtain baseline values for health parameters of a turbine engine during a calibration process. For example, the TEHM apparatus can obtain sensor data during a first use of a turbine engine. A first use can be a first flight of an aircraft in which the turbine engine is used. The example TEHM apparatus can divide the first flight into one or more flight bins, flight categories, or flight zones. In some examples, the TEHM apparatus generates flight bins to credit calculated, determined, and/or obtained information (e.g., model outputs, sensor data, etc.) to different turbine engine behaviors. For example, the turbine engine can have different operating and performance characteristics for different flight conditions based on altitude, air speed, day temperature, engine speed, etc., and/or a combination thereof. The example TEHM apparatus can map the information to the different turbine engine behaviors via the flight bins.

In some examples, the flight bins are based on an altitude and a Mach number. For example, the turbine engine can have a different behavior for different combinations of altitudes and Mach numbers. The example TEHM apparatus can define the flight bins to capture different turbine engine behaviors for different combinations or ranges of parameters (e.g., aircraft parameters, turbine engine parameter, flight parameters, etc.). Alternatively, the flight bins can be based on turbine engine speed (e.g., 60% of full speed, 80% of full speed, etc.), a throttle power setting parameter of the aircraft or the turbine engine, etc. For example, the TEHM apparatus can obtain and store sensor data within 5 altitude bands, where within each altitude band there are 4 Mach number bands, to produce a 5×4 grid of flight bins for a total of 20 flight bins.

Some example TEHM apparatus disclosed herein calculate health parameters of a turbine engine based on data stored in one or more flight bins. For example, the TEHM apparatus can calculate an efficiency modifier and/or a flow modifier of a rotating component of a turbine engine when sufficient data (e.g., at least one data point) has been obtained for each pre-determined bin. For example, the TEHM apparatus can calculate 10 health parameters based on determining an efficiency modifier and a flow modifier for each of the following components of a turbine engine: a fan, a booster compressor, a high-pressure compressor, a high-pressure turbine, and a low-pressure turbine. In practice, due to limited number of sensors being available on the turbine engine, only a subset of (e.g., six out of possibly ten) health parameters may be estimated. Additionally or alternatively, the example TEHM apparatus can calculate health parameters in addition to those listed above.

In some examples, the TEHM apparatus determine thresholds for evaluating health parameters based on a current flight bin of a turbine engine. For example, a threshold used to analyze sensor data, health parameters, etc., can vary between flight bins. For example, the TEHM apparatus can determine that a first threshold used to analyze an efficiency modifier for a high-pressure turbine operating in a first flight bin is 1%. The example TEHM apparatus can then determine a second threshold is 2% when the high-pressure turbine transitions from the first flight bin to a second flight bin.

In some examples, each flight bin or a set of flight bins has a different threshold than a subsequent flight bin or a subsequent set of flight bins. For example, a turbine engine that is categorized into 20 flight bins can have up to 20 different thresholds for evaluating a health parameter. Alternatively, there can be more than 20 different thresholds. For example, the TEHM apparatus can have multiple thresholds per flight bin. For example, the TEHM apparatus can have 3 thresholds per flight bin to indicate different levels of conditions (e.g., levels of degradation, levels of efficiency, levels of operation, etc.) for a turbine engine component. For example, the TEHM apparatus can have a first threshold of 1%, a second threshold of 2%, and a third threshold of 3%, where the third threshold indicates a condition of the turbine engine component has reached a level of degradation greater than the second threshold.

The example TEHM apparatus can store a baseline value for the efficiency modifier and/or the flow modifier for each of the rotating components of the turbine engine when values for the efficiency modifiers and/or the flow modifiers approach steady-state. The example TEHM apparatus can store the baseline values in a database. For example, the TEHM apparatus can store a baseline value for an efficiency modifier and a flow modifier for a fan of a turbine engine for each of the 20 flight bins.

Some example TEHM apparatus disclosed herein monitor health information of a turbine engine by comparing operational health information to baseline health information. During subsequent flights or uses of the turbine engine, the example TEHM apparatus can calculate an operational value for a health parameter of a turbine engine component. For example, the TEHM apparatus can calculate an operational value for an efficiency modifier of a high-pressure compressor. The example TEHM apparatus can determine a flight bin corresponding to a current altitude and a current Mach number of the turbine engine. The example TEHM apparatus can map the flight bin to a corresponding baseline health parameter in a look-up table. For example, the TEHM apparatus can map the flight bin to a baseline value for an efficiency modifier of the high-pressure compressor. The example TEHM apparatus can compare the operational value to the baseline value to calculate a difference. The example TEHM apparatus can identify a condition of the turbine engine component based on the difference.

Some example TEHM apparatus disclosed herein control a turbine engine based on monitoring health information of the turbine engine. During subsequent flights of the turbine engine, the example TEHM apparatus can calculate an operational value for a health parameter of a turbine engine component. The example TEHM apparatus can determine a flight bin and map the flight bin to a baseline value for the health parameter in a look-up table. In response to determining a difference between the operational value and the baseline value, the example TEHM apparatus can generate a command to control the turbine engine. For example, the TEHM apparatus can generate and transmit a command to the turbine engine to change turbine engine clearance based on an efficiency modifier for a high-pressure turbine being sub-optimal.

FIG. 1 is a schematic illustration of an example turbine engine health monitor (TEHM) 100 monitoring an example gas turbine engine 102. In the illustrated example, the TEHM 100 is a full-authority digital engine control (FADEC) unit. Alternatively, the TEHM 100 may be any other type of data acquisition and/or control computing device. FIG. 1 illustrates a cross-sectional view of the engine 102 that can be utilized within an aircraft in accordance with aspects of the disclosed examples. The gas turbine engine 102 is shown having a longitudinal or axial centerline axis 104 extending throughout the gas turbine engine 102 for reference purposes. In general, the engine 102 can include a core gas turbine engine 106 and a fan section 108 positioned upstream thereof. The core gas turbine engine 106 can generally include a substantially tubular outer casing 110 that defines an annular inlet 112. In addition, the outer casing 110 can further enclose and support a booster compressor 114 for increasing the pressure of the air that enters the core gas turbine engine 106 to a first pressure level. A high-pressure, multi-stage, axial-flow compressor 116 can then receive the pressurized air from the booster compressor 114 and further increase the pressure of such air to a second pressure level.

In the illustrated example of FIG. 1, the pressurized air exiting the high-pressure compressor 116 can then flow to a combustor 118 within which fuel is injected into the flow of pressurized air, with the resulting mixture being combusted within the combustor 118. The high-energy combustion products are directed from the combustor 118 along the hot gas path of the engine 102 to a first (high-pressure) turbine 120 for driving the high-pressure compressor 116 via a first (high-pressure) drive shaft 122, and then to a second (low-pressure) turbine 124 for driving the booster compressor 114 and fan section 108 via a second (low-pressure) drive shaft 126 that is generally coaxial with first drive shaft 122. After driving each of the turbines 120 and 124, the combustion products can be expelled from the core gas turbine engine 106 via an exhaust nozzle 128 to provide propulsive jet thrust.

In some examples, each of the compressors 114, 116 can include a plurality of compressor stages, with each stage including both an annular array of stationary compressor vanes and an annular array of rotating compressor blades positioned immediately downstream of the compressor vanes. Similarly, each of the turbines 120, 124 can include a plurality of turbine stages, with each stage including both an annular array of stationary nozzle vanes and an annular array of rotating turbine blades positioned immediately downstream of the nozzle vanes.

Additionally, as shown in FIG. 1, the fan section 108 of the engine 102 can generally include a rotatable, axial-flow fan rotor assembly 130 that is configured to be surrounded by an annular fan casing 132. The fan casing 132 can be configured to be supported relative to the core gas turbine engine 106 by a plurality of substantially radially-extending, circumferentially-spaced outlet guide vanes 134. As such, the fan casing 132 can enclose the fan rotor assembly 130 and its corresponding fan rotor blades 136. Moreover, a downstream section 138 of the fan casing 132 can extend over an outer portion of the core gas turbine engine 106 to define a secondary, or by-pass, airflow conduit 140 that provides additional propulsive jet thrust.

In some examples, the second (low-pressure) drive shaft 126 is directly coupled to the fan rotor assembly 130 to provide a direct-drive configuration. Alternatively, the second drive shaft 126 can be coupled to the fan rotor assembly 130 via a speed reduction device 142 (e.g., a reduction gear or gearbox) to provide an indirect-drive or geared drive configuration. Such a speed reduction device(s) can also be provided between any other suitable shafts and/or spools within the engine 102 as desired or required.

In the illustrated example of FIG. 1, the engine 102 includes sensors 144, 146 communicatively coupled to the TEHM 100. Alternatively, the sensors 144, 146 can be communicatively coupled to a control system of an aircraft coupled to the engine 102, where the control system is communicatively coupled to the example TEHM 100. In the illustrated example, the sensors 144, 146 are gas-path temperature sensors. For example, the sensors 144, 146 can be monitoring a compressor inlet temperature and a temperature of gas exiting the high-pressure turbine 120. Alternatively, the sensors 144, 146 can be gas-path pressure sensors, rotor speed sensors, etc. Although the sensors 144, 146 are depicted in FIG. 1 as being at specific locations, the sensors 144, 146 can be located elsewhere on the engine 102. Additionally or alternatively, there can be more than two sensors 144, 146 located on the engine 102. A typical implementation has six gas-path temperature sensors 144, 146. Additionally or alternatively, there can be more than one example TEHM 100 coupled to the engine 102. Although the example TEHM 100 is depicted in FIG. 1 as being proximate the fan section 108, the TEHM 100 can be located elsewhere on the engine 102 or elsewhere on the aircraft coupled to the engine 102.

During operation of the engine 102, an initial air flow (indicated by arrow 148) can enter the engine 102 through an associated inlet 150 of the fan casing 132. The air flow 148 then passes through the fan blades 136 and splits into a first compressed air flow (indicated by arrow 152) that moves through conduit 140 and a second compressed air flow (indicated by arrow 154) which enters the booster compressor 114. The pressure of the second compressed air flow 154 is then increased and enters the high-pressure compressor 116 (as indicated by arrow 156). After mixing with fuel and being combusted within the combustor 118, the combustion products 158 exit the combustor 118 and flow through the first turbine 120. Thereafter, the combustion products 158 flow through the second turbine 124 and exit the exhaust nozzle 128 to provide thrust for the engine 102.

Figure 2:
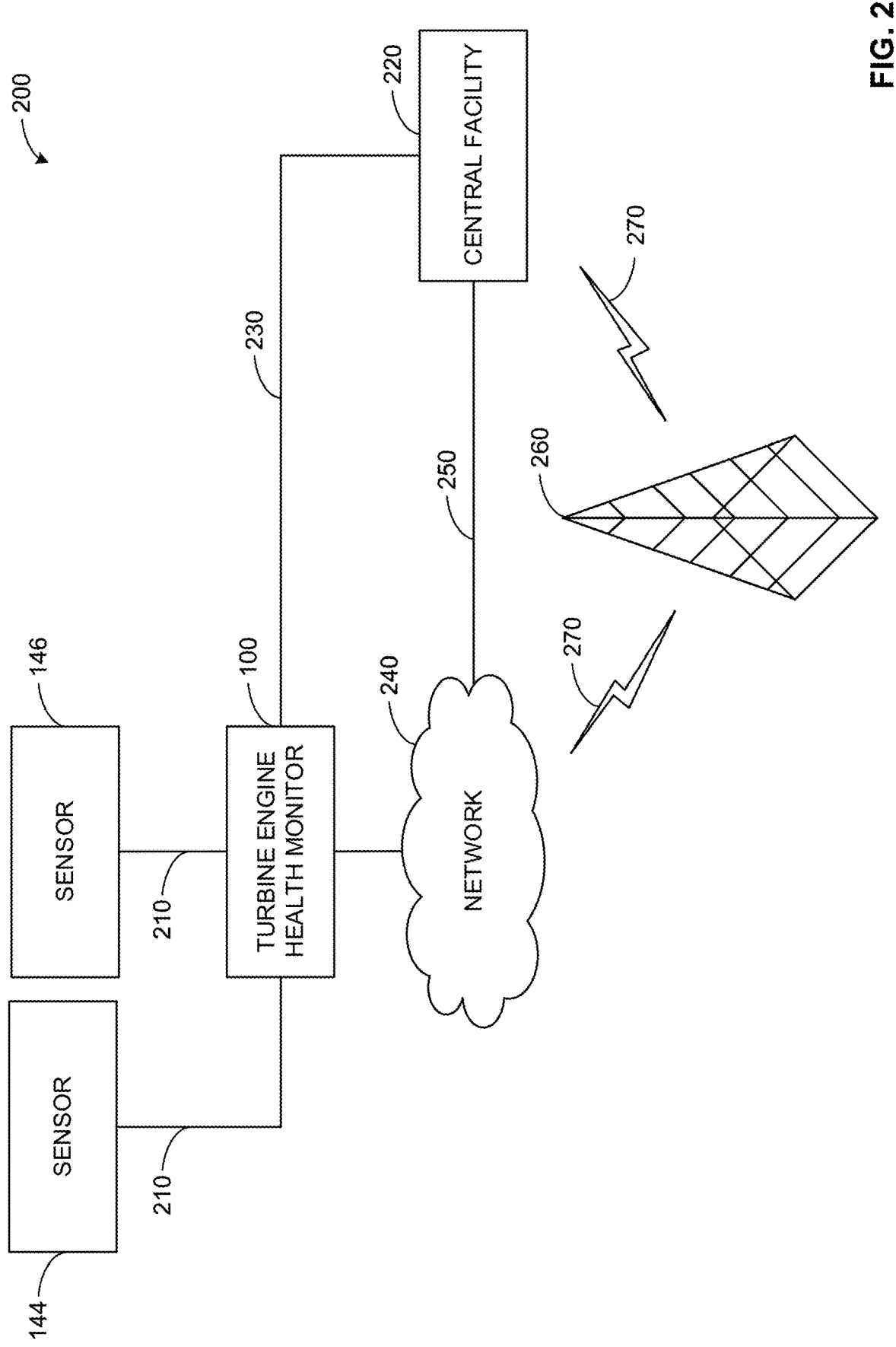
FIG. 2 illustrates an example turbine engine health monitoring system for the example gas turbine engine of FIG. 1.

FIG. 2 is a schematic illustration of an example turbine engine health monitoring system 200 for the gas turbine engine 102 of FIG. 1. In the illustrated example of FIG. 2, the sensors 144, 146 of FIG. 1 are communicatively coupled to the turbine engine health monitor (TEHM) 100 via sensor connections 210. The example TEHM 100 obtains sensor data from the sensors 144, 146 to monitor health information of the gas turbine engine 102. The sensor connections 210 can include direct wired or direct wireless connections. For example, a direct wired connection can involve a direct connection using wires in a harness connecting the sensors to the TEHM 100, or a bus such as the Engine Area Distributed Interconnect. Network (EADIN) bus. In another example, the direct wireless connections can implement a Bluetooth® connection, a Wi-Fi Direct® connection, or any other wireless communication protocol. Further shown in FIG. 2 are a central facility 220, a central facility direct connection 230, a network 240, a central facility network connection 250, a wireless communication system 260, and wireless communication links 270.

In the illustrated example of FIG. 2, the example TEHM 100 is shown to be communicatively coupled to the central facility 220 via the central facility direct connection 230. For example, the central facility 220 can obtain health information such as flight data (e.g., altitudes, turbine engine speeds, temperatures, etc.), operational health parameters, baseline health parameters, etc., from the TEHM 100 via the central facility direct connection 230. The central facility direct connection 230 can be a direct wired or a direct wireless connection. For example, the central facility 220 can download health information of the engine 102 via a manual download of the data from the TEHM 100 to a computing device such as a laptop, a server, etc., followed by a subsequent upload to the central facility 220. Alternatively, the central facility 220 can be directly connected to the TEHM 100 to obtain data.

The central facility 220 of the illustrated example is a server that collects and processes health information of the engine 102. Alternatively, the central facility 220 can be a laptop, a desktop computer, a tablet, or any type of computing device. The central facility 220 analyzes the health information of the engine 102 to determine maintenance actions and/or service intervals. For example, the central facility 220 can determine that the high-pressure compressor 116 of FIG. 1 requires a water-wash based on a comparison of operational health parameters of the high-pressure compressor 116 to baseline health parameters of the high-pressure compressor 116.

Additionally or alternatively, the central facility 220 can obtain health information from the example TEHM 100 via the network 240. For example, the central facility 220 can obtain operational health parameters of the engine 102 from the TEHM 100 by connecting to the network 240 via the central facility network connection 250. The central facility network connection 250 can be a direct wired or a direct wireless connection. For example, the TEHM 100 can transmit information (e.g., sensor data, health parameters, etc.) to a control system of an aircraft coupled to the engine 102. The aircraft control system can subsequently transmit the information to the central facility 220 via the network 240 (e.g., via the central facility network connection 250, the wireless communication links 270, etc.).

The example network 240 of the illustrated example of FIG. 2 is the Internet. However, the example network 240 can be implemented using any suitable wired and/or wireless network(s) including, for example, one or more data buses, one or more Local Area Networks (LANs), one or more wireless LANs, one or more cellular networks, one or more private networks, one or more public networks, etc. The example network 240 enables the example TEHM 100 to be in communication with the central facility 220. As used herein, the phrase "in communication," including variances therefore, encompasses direct communication and/or indirect communication through one or more intermediary components and does not require direct physical (e.g., wired) communication and/or constant communication, but rather includes selective communication at periodic and/or aperiodic intervals, as well as one-time events.

In some examples, the TEHM 100 is unable to transmit information (e.g., health information) to the central facility 220 via the central facility direct connection 230, the central facility network connection 250, etc. For example, a routing device upstream of the central facility 220 can stop providing functional routing capabilities to the central facility 220. In the illustrated example, the turbine engine health monitoring system 200 includes additional capabilities to enable communication (e.g., data transfer) between the central facility 220 and the network 240. As shown in FIG. 2, the central facility 220 and the network 240 include the capabilities to transmit and/or receive data (e.g., health information) through the wireless communication system 260 (e.g., the cellular communication system, the satellite communication system, the air band radio communication system, the Aircraft Communications Addressing and Reporting System (ACARS), etc.) via the wireless communication links 270.

The wireless communication links 270 of the illustrated example of FIG. 2 are cellular communication links. However, any other method and/or system of communication can additionally or alternatively be used such as an Ethernet connection, a Bluetooth connection, a Wi-Fi connection, a satellite connection, etc. Further, the wireless communication links 270 of FIG. 2 can implement cellular connections via a Global System for Mobile Communications (GSM). However, any other systems and/or protocols for communications can be used such as Time Division Multiple Access (TDMA), Code Division Multiple Access (CDMA), Worldwide Interoperability for Microwave Access (WiMAX), Long Term Evolution (LTE), etc.

While an example manner of implementing the turbine engine health monitoring system 200 of FIG. 2 is illustrated in FIG. 2, one or more of the elements, processes, and/or devices illustrated in FIG. 2 may be combined, divided, re-arranged, omitted, eliminated, and/or implemented in any other way. Further, the example TEHM 100, the example sensors 144, 146, the example sensor connections 210, the example central facility 220, the example central facility direct connection 230, the example network 240, the example central facility network connection 250, the example wireless communication system 260, the example wireless communication links 270 and/or, more generally, the example turbine engine health monitoring system 200 of FIG. 2 may be implemented by hardware, software, firmware, and/or any combination of hardware, software, and/or firmware. Thus, for example, any of the example TEHM 100, the example sensors 144, 146, the example sensor connections 210, the example central facility 220, the example central facility direct connection 230, the example network 240, the example central facility network connection 250, the example wireless communication system 260, the example wireless communication links 270 and/or, more generally, the example turbine engine health monitoring system 200 of FIG. 2 can be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example TEHM 100, the example sensors 144, 146, the example sensor connections 210, the example central facility 220, the example central facility direct connection 230, the example network 240, the example central facility network connection 250, the example wireless communication system 260, the example wireless communication links 270 and/or, more generally, the example turbine engine health monitoring system 200 of FIG. 2 is/are hereby expressly defined to include a tangible computer readable storage device or storage disk such as a memory, a digital versatile disk (DVD), a compact disk (CD), a Blu-ray disk, etc., storing the software and/or firmware. Further still, the example turbine engine health monitoring system 200 of FIG. 2 may include one or more elements, processes, and/or devices in addition to, or instead of, those illustrated in FIG. 2, and/or may include more than one of any or all of the illustrated elements, processes, and devices.

Figure 3:
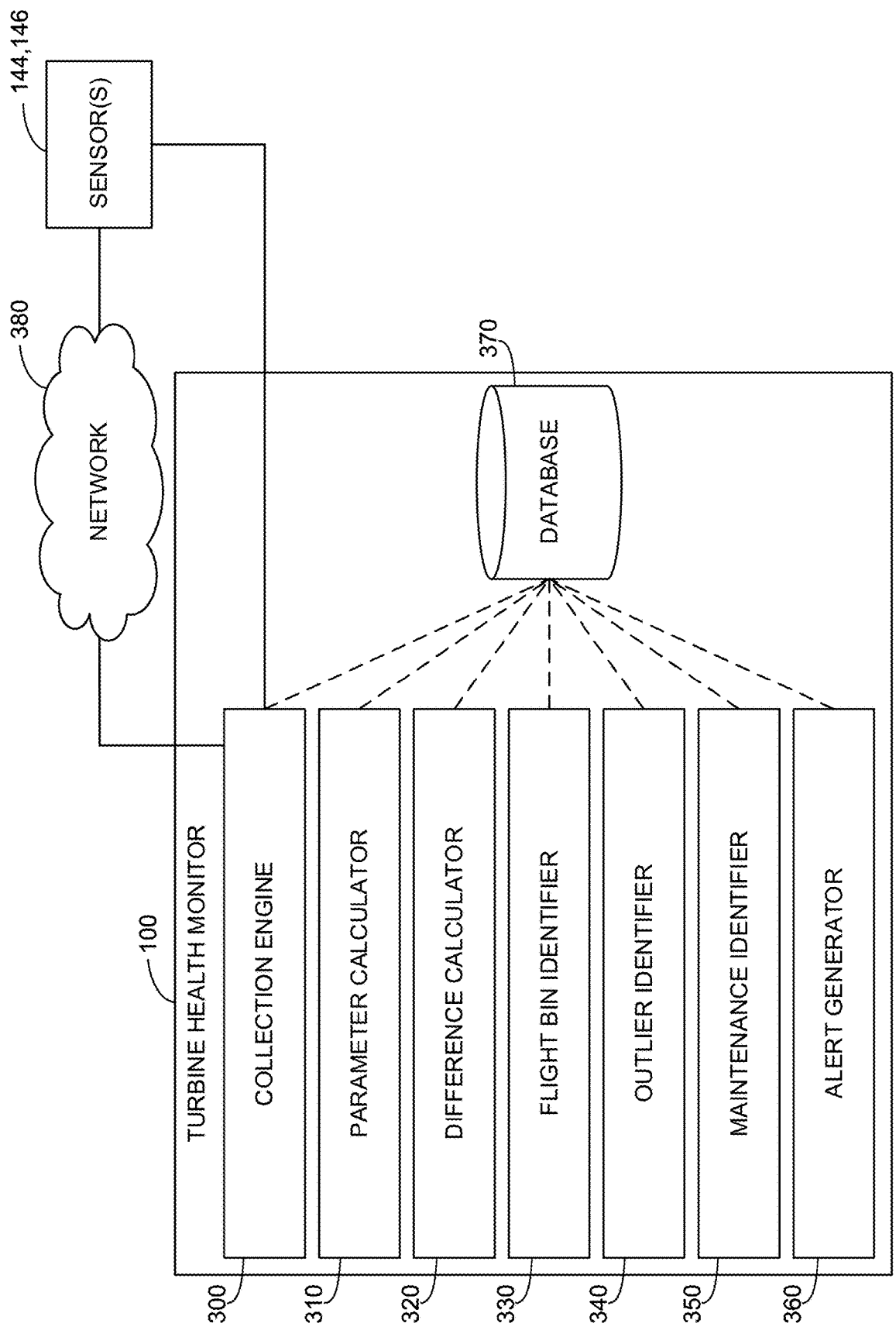
FIG. 3 is a block diagram of an example implementation of an example turbine engine health monitor apparatus.

FIG. 3 is a block diagram of an example implementation of the example TEHM 100 of FIGS. 1 and/or 2. The example TEHM 100 of FIG. 3 includes an example collection engine 300, an example parameter calculator 310, an example difference calculator 320, an example flight bin identifier 330, an example outlier identifier 340, an example maintenance manager 350, an example alert generator 360, and an example database 370.

In the illustrated example of FIG. 3, the TEHM 100 includes the collection engine 300 to select and/or process sensor data obtained from the sensors 144, 146 of FIG. 1. For example, the collection engine 300 can select and/or process sensor data obtained from the sensors 144, 146 via a direct wired or a direct wireless connection, and/or from the network 380. In some examples, the collection engine 300 selects and/or processes sensor data related to a sensor of an aircraft coupled to the engine 102 of FIG. 1 such as an altitude, a Mach number, a day temperature, etc. The collection engine 300 can obtain the sensor data related to the sensor of the aircraft via the network 380.

In some examples, the collection engine 300 selects obtained sensor data of interest to be used by one or more algorithms, processes, programs, etc. Selected obtained sensor data can include, for example, an analog electrical signal, a digital electrical signal, etc. The collection engine 300 can process the sensor data by converting (e.g., converting using a conversion calculation, converting to different units of measure, etc.), scaling (e.g., scaling using a scaling factor), and/or translating (e.g., translating using a sensitivity curve) the electrical output from the sensors 144, 146 to a measure of pressure, temperature, rotor speed, etc., that can be used by the example TEHM 100. In some examples, the collection engine 300 determines a history of the turbine engine 102. For example, the collection engine 300 can determine whether the engine 102 is new, has completed a first flight, a first use, etc. In some instances, the collection engine 300 determines whether the engine 102 is new based on operating hours, user input, etc. For example, the collection engine 300 can determine that the engine 102 has completed a first flight based on a value of a flag (e.g., a flag in computer and/or machine readable instructions, a first flight flag, etc.) stored in the database 370, where maintenance personnel set the flag. In some instances, the collection engine 300 stores information (e.g., processed sensor data) in the database 370 and/or retrieves information (e.g., a first flight flag, unprocessed sensor data, etc.) from the database 370.

In the illustrated example of FIG. 3, the TEHM 100 includes the parameter calculator 310 to calculate health parameters of the turbine engine 102. For example, the parameter calculator 310 can calculate an operational health parameter such as an efficiency modifier, a flow modifier, etc., of a component of the turbine engine 102 such as the fan section 108, the high-pressure turbine 120, etc. In another example, the parameter calculator 310 can calculate a baseline health parameter such as an efficiency modifier, a flow modifier, etc., of a component of the turbine engine 102 such as the booster compressor 114, a low-pressure turbine 124, etc., during a calibration process (e.g., during a first flight of the engine 102).

In some examples, the parameter calculator 310 calculates parameters related to an aircraft coupled to the engine 102 of FIG. 1. For example, the parameter calculator 310 can calculate an altitude, a Mach number, a day temperature, etc., based on sensor data from an altitude sensor, a Mach sensor, a temperature sensor, etc., coupled to the aircraft. In some instances, the parameter calculator 310 calibrates sensor outputs obtained during an operational process. For example, the parameter calculator 310 can calculate a correction factor based on a difference between a model output for the sensor 144 of FIG. 1 and a sensor output for the sensor 144 during a calibration process. The parameter calculator 310 can store the correction factor in the database 370. During subsequent flights, the parameter calculator 310 can offset a sensor output from the sensor 144 with the correction factor. In some examples, the parameter calculator 310 stores information (e.g., an efficiency modifier, a flow modifier, etc.) in the database 370 and/or retrieves information (e.g., processed sensor data) from the database 370.

In the illustrated example of FIG. 3, the TEHM 100 includes the difference calculator 320 to calculate differences between health parameters, eliminate sensor bias, etc. In some examples, the difference calculator 320 calculates a difference (e.g., a health parameter difference) between an operational health parameter of a turbine engine component and a baseline health parameter of the turbine engine component. For example, the difference calculator 320 can calculate a difference (e.g., 1%, 2%, etc.) between an operational value of an efficiency modifier of the high-pressure turbine 120 of FIG. 1 and a baseline value of the efficiency modifier of the high-pressure turbine 120.

In some instances, the difference calculator 320 calculates a difference (e.g., a sensor output difference) between values of sensor outputs. The sensor outputs may be rotor speed (e.g., core speed, etc.), temperature (e.g., exhaust gas temperature, etc.), pressure (e.g., compressor exit pressure, etc.), etc. For example, the difference calculator 320 can calculate a difference between a first baseline sensor output (e.g., a first baseline exhaust gas temperature, etc.) of the sensor 144 and a second baseline sensor output (e.g., a second baseline exhaust gas temperature, etc.) of the sensor 144, where the second baseline sensor output is obtained later than the first baseline sensor output. The difference calculator 320 can determine that sensor outputs from the sensor 144 have achieved steady-state based on the difference. In another example, the difference calculator 320 can calculate an adjusted operational sensor output, where the adjusted operational sensor output is based on a difference between an operational sensor output of the sensor 144 and a correction factor. For example, the difference calculator 320 can use a correction factor to adjust sensor data (e.g., baseline sensor data, operational sensor data, etc.) to eliminate sensor bias. For example, the correction factor can be calculated based on a calibration process of the engine 102 (e.g., the correction factor calculated by the parameter calculator 310).

In some examples, the difference calculator 320 calculates a difference (e.g., a model difference) between a model output and a sensor output. For example, the difference calculator 320 can calculate a difference between a model output (e.g., a calculated or estimated output) and a measured output from the sensors 144, 146 for an exhaust gas temperature, a core speed, etc. In another example, the difference calculator 320 can calculate a model difference between (1) a value of a flow modifier of the booster compressor 114 of FIG. 1 calculated based on a model characterizing the engine 102 and sensor data from the sensors 144, 146 and (2) a first flight or other previously calculated and stored value of the flow modifier of the booster compressor 114.

In some examples, the difference calculator 320 determines whether a difference satisfies a threshold. For example, the difference calculator 320 can determine whether a model difference satisfies a threshold (e.g., the difference is greater than 1%, 5%, 10%, etc.). The example TEHM 100 can adjust one or more parameters of the model based on the difference. For example, the TEHM 100 can adjust one or more parameters of the model based on the difference satisfying a threshold. In some instances, the difference calculator 320 stores information (e.g., a health parameter difference, a sensor output difference, etc.) in the database 370 and/or retrieves information (e.g., baseline health parameters, operational health parameters, sensor data, etc.) from the database 370.

In the illustrated example of FIG. 3, the TEHM 100 includes the flight bin identifier 330 to determine a flight bin in which the turbine engine 102 is operating. For example, the flight bin identifier 330 can determine an altitude, a Mach number, etc., of the engine 102 of FIG. 1. For example, the flight bin identifier 330 can obtain the altitude, the Mach number, etc., of the engine 102 from one or more sensors (e.g., an altitude sensor, a Mach sensor, the sensors 144, 146, etc.) coupled to the engine 102 and/or installed on an aircraft coupled to the engine 102. In another example, the flight bin identifier 330 can determine an engine speed (e.g., a turbine engine speed), a throttle power setting parameter of the aircraft or the turbine engine, etc. The flight bin identifier 330 can map the altitude, the Mach number, the engine speed, the throttle power setting parameter of the aircraft or the turbine engine, etc., to a flight bin in a look-up table.

In some examples, the flight bin identifier 330 divides a flight profile of an aircraft into one or more flight bins. For example, a user can input parameter ranges for potential flights of an aircraft into the flight bin identifier 330. In another example, an altitude sensor can input an altitude range of 0 to 50,000 feet and a Mach number of 0 to 0.82 into the flight bin identifier 330. The flight bin identifier 330 can divide the flight map into 5 altitude-Mach ranges or flight-phase bands (e.g., bands representative of takeoff, climb, mid-cruise, high-cruise, and descent of an aircraft). The flight bin identifier 330 can sub-divide each flight-phase band into four speed bands indicative of engine power level to produce a 5×4 grid of flight bins for a total of 20 flight bins. In some examples, the flight bin identifier 330 associates or credits a health parameter with a flight bin. For example, the flight bin identifier 330 can assign an efficiency modifier, a flow modifier, etc., to the booster compressor 114 of FIG. 1 to correspond to a specific flight bin (e.g., a bin corresponding to altitude and Mach number ranges indicative of high-altitude cruise and fan speed between 80% and 90%, etc.). Additional details in connection with example flight bins are described below in accordance with FIG. 4. In some instances, the flight bin identifier 330 stores information (e.g., health information or sensor data associated with a flight bin) in the database 370 and/or retrieves information (e.g., a flight bin) from the database 370.

In the illustrated example of FIG. 3, the TEHM 100 includes the outlier identifier 340 to determine whether a value of a health parameter is an outlier. In some examples, the outlier identifier 340 calculates at least a mean value and a standard deviation value for calculated health parameters for a specified flight bin. For example, the outlier identifier 340 can calculate a mean value and a standard deviation value for health parameter values calculated during a calibration process (e.g., a first flight of the engine 102) for a specific flight bin (e.g., a bin corresponding to altitude and Mach number ranges indicative of high-altitude cruise and fan speed between 80% and 90%, etc.). During subsequent flights in the specified flight bin, the outlier identifier 340 can determine a difference between the mean value and the value for the calculated health parameter. The outlier identifier 340 can determine that the health parameter value of interest is an outlier value when the difference satisfies a threshold (e.g., the difference exceeds one or more standard deviation values).

In some examples, the outlier identifier 340 removes the identified outlier value from a data set. In some instances, the outlier identifier 340 determines whether a data point of interest within selected model data, sensor data, etc., is an outlier. For example, the outlier identifier 340 can calculate a mean value and a standard deviation value for resistance values, voltage amplitudes, etc., included in sensor data. In some instances, the outlier identifier 340 determines a difference between the mean value and a value of interest during a time period. The outlier identifier 340 can determine that the value of interest is an outlier value when the difference satisfies a threshold (e.g., the difference exceeds one or more standard deviation values). In some instances, the outlier identifier 340 removes the identified outlier value from the sensor data. In some examples, the outlier identifier 340 stores information (e.g., a mean value, a standard deviation value, an outlier value, etc.) in the database 370 and/or retrieves information (e.g., a data point of interest, a health parameter value of interest, a mean value, a standard deviation value, etc.) from the database 370.

In some instances, the outlier identifier 340 uses qualitative information to detect an outlier. For example, the outlier identifier 340 can apply information generated from maintenance tasks conducted during a shop visit (e.g., one or more turbine blades of the fan section 108 replaced during a shop visit, the TEHM 100 being transferred from the turbine engine 102 to another turbine engine, etc.) to account for large differences (e.g., values that satisfy an outlier threshold) in values calculated by the parameter calculator 310, the difference calculator 320, etc.

In the illustrated example of FIG. 3, the TEHM 100 includes the maintenance manager 350 to identify a condition, a maintenance task, a service interval, etc., for a turbine engine component and/or a turbine engine assembly. In some examples, the maintenance manager 350 quantitatively assesses the health of a component of the turbine engine 102. For example, the maintenance manager 350 can determine that the booster compressor 114 of FIG. 1 has 20% useful operating time remaining based on a value of an efficiency modifier of the booster compressor 114 during one or more flight bins. In some instances, the maintenance manager 350 identifies a maintenance task to be conducted on a turbine engine component. For example, the maintenance manager 350 can determine that the high-pressure turbine 120 requires clearance adjustment based on a value of an efficiency modifier of the high-pressure turbine 120 during one or more flight bins.

In some examples, the maintenance manager 350 identifies a service interval for a turbine engine assembly. For example, the maintenance manager 350 can determine an estimated timeline for the engine 102 of FIG. 1 to undergo general inspection, maintenance, service, etc., based on a value of an efficiency modifier and/or a flow modifier of the booster compressor 114 during one or more flight bins. In some instances, the maintenance manager 350 stores information (e.g., conditions, maintenance tasks, etc.) in the database 370 and/or retrieves information (e.g., a health parameter) from the database 370.

In the illustrated example of FIG. 3, the TEHM 100 includes the alert generator 360 to generate an alert based on a value of a health parameter of the turbine engine 102. For example, the alert generator 360 can generate an alert when a difference between (1) an operational value of a health parameter of the engine 102, and (2) a baseline value of the health parameter satisfies a threshold (e.g., the difference is greater than 1%, 2%, 5%, 10%, etc.). In response to determining that the difference satisfies a threshold, the alert generator 360 can generate an alert such as generating a log and/or a report, displaying the alert on a display, transmitting the alert to a network, etc.

In some examples, the alert generator 360 employs a pre-defined threshold that can be dependent on a default threshold value or user input. In some examples, the alert generator 360 utilizes a calculated threshold. For example, the alert generator 360 can calculate a threshold based on or more standard deviation values. In some examples, the alert generator 360 stores information (e.g., a generated alert, a log, a report, etc.) in the database 370 and/or retrieves information (e.g., a threshold) from the database 370. For example, the alert generator 360 can store a report including a maintenance alert for the booster compressor 114 in the database 370, where the central facility 220 of FIG. 2, an aircraft maintenance system, etc., can retrieve the report. In some examples, the alert generator 360 transmits information to an aircraft control system, the central facility 220, etc. For example, the alert generator 360 can transmit a generated alert, a log, a report, etc., to an aircraft maintenance system, the central facility 220, etc.

In some examples, the alert generator 360 generates a command to adjust a parameter of the turbine engine 102 and/or of an aircraft coupled to the turbine engine 102. The alert generator 360 can generate a command based on a parameter calculated by the parameter calculator 310, a difference determined by the difference calculator 320, a condition identified by the maintenance manager 350, etc. For example, the alert generator 360 can generate a command and transmit the command to the turbine engine 102 and/or to an aircraft control system of the aircraft coupled to the turbine engine 102. The alert generator 360 can generate the command to improve efficiency of the turbine engine 102, sustain health of the turbine engine 102, extend maintenance period intervals of the turbine engine 102, etc. For example, the alert generator 360 can generate a command in response to the maintenance manager 350 identifying a degradation condition of the booster compressor 114 of FIG. 1 by changing an engine speed, changing a fan speed, adjusting a fuel injection rate, etc.

In the illustrated example of FIG. 3, the TEHM 100 includes the database 370 to record data (e.g., health parameters, sensor data, etc.). In some examples, the database 370 records a flag (e.g., a flag in computer and/or machine readable instructions) and/or a variable associated with the obtained data. In the illustrated example, the database 370 is communicatively coupled to the central facility 220, the collection engine 300, the parameter calculator 310, the difference calculator 320, the flight bin identifier 330, the outlier identifier 340, the maintenance manager 350, and the alert generator 360. The example database 370 can respond to queries for information related to data in the database 370. For example, the database 370 can respond to queries for additional data by providing the additional data (e.g., the one or more data points), by providing an index associated with the additional data in the database 370, etc. The example database 370 can additionally or alternatively respond to queries when there is no additional data in the database 370 by providing a null index, an end of database identifier, etc. For example, the central facility 220 of FIG. 2 can query the database 370 for a report generated by the alert generator 360. In response to the query, the example database 370 can transmit the report and corresponding information such as data logs, maintenance alerts, etc., to the example central facility 220.

The example database 370 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 370 can additionally or alternatively be implemented by one or more double data rate (DDR) memories, such as DDR, DDR2, DDR3, DDR4, mobile DDR (mDDR), etc. The example database 370 can additionally or alternatively be implemented by one or more mass storage devices such as hard disk drive(s), compact disk drive(s) digital versatile disk drive(s), solid-state drives, etc. While in the illustrated example the database 370 is illustrated as a single database, the database 370 can be implemented by any number and/or type(s) of databases.

In the illustrated example of FIG. 3, the network 380 is a bus and/or a computer network. For example, the network 380 can be an internal controller bus, a process control network, a direct wired connection to an interface of the sensors 144, 146, etc. In some examples, the network 380 is a network with the capability of being communicatively coupled to the Internet. However, the network 380 can be implemented using any suitable wired and/or wireless network(s) including, for example, one or more data buses, one or more Local Area Networks (LANs), one or more wireless LANs, one or more cellular networks, one or more fiber optic networks, one or more satellite networks, one or more private networks, one or more public networks, etc. The network 380 can enable the collection engine 300 to be in communication with the sensors 144, 146, a control system of an aircraft, etc.

While an example manner of implementing the TEHM 100 of FIGS. 1 and/or 2 is illustrated in FIG. 3, one or more of the elements, processes and/or devices illustrated in FIG. 3 may be combined, divided, re-arranged, omitted, eliminated, and/or implemented in any other way. Further, the example collection engine 300, the example parameter calculator 310, the example difference calculator 320, the example flight bin identifier 330, the example outlier identifier 340, the example maintenance manager 350, the example alert generator 360, the example database 370, the example network 380 and/or, more generally, the example TEHM 100 of FIG. 3 may be implemented by hardware, software, firmware, and/or any combination of hardware, software, and/or firmware. Thus, for example, any of the example collection engine 300, the example parameter calculator 310, the example difference calculator 320, the example flight bin identifier 330, the example outlier identifier 340, the example maintenance manager 350, the example alert generator 360, the example database 370, the example network 380 and/or, more generally, the example TEHM 100 of FIG. 3 can be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example collection engine 300, the example parameter calculator 310, the example difference calculator 320, the example flight bin identifier 330, the example outlier identifier 340, the example maintenance manager 350, the example alert generator 360, the example database 370, the example network 380 and/or, more generally, the example TEHM 100 of FIG. 3 is/are hereby expressly defined to include a tangible computer readable storage device or storage disk such as a memory, a digital versatile disk (DVD), a compact disk (CD), a Blu-ray disk, etc., storing the software and/or firmware. Further still, the example TEHM 100 of FIG. 3 may include one or more elements, processes, and/or devices in addition to, or instead of, those illustrated in FIG. 3, and/or may include more than one of any or all of the illustrated elements, processes, and devices.

FIG. 4 is an example table 400 depicting example flight bins of the turbine engine 102 of FIG. 1. The example table 400 depicts a 5×4 grid of flight bins. Each of the example flight bins is based on an altitude, a Mach number, and a power level indicator. In the illustrated example, the power level indicator is a percentage of a design speed of the engine 102 and is designated by % N1. In some examples, the design speed is approximated as the takeoff speed of the engine 102. For example, a power level indicator of 60% N1 can correspond to the engine 102 idling. In another example, a power level indicator of 100% N1 can correspond to the engine 102 taking off from a flight surface (e.g., a flight runway).

Additionally or alternatively, the example flight bins can be based on rotor speed, day temperature, etc. In some examples, the flight bin identifier 330 of FIG. 3 determines an altitude, a Mach number, and a power level indicator, and maps the altitude, the Mach number, and the power level indicator to a flight bin. For example, the flight bin identifier 330 can map an altitude of 25,000 feet, a Mach number of 0.65, and a power level indicator of 82% N1 to flight bin 9. In some instances, the collection engine 300 and the parameter calculator 310 can store obtained information and/or calculated information in the database 370 to correspond to a flight bin of the example table 400. For example, the collection engine 300 can obtain sensor data from the sensor 144 of FIG. 1 at an altitude of 25,000 feet, a Mach number of 0.65, and a power level indicator of 82%. The parameter calculator 310 can calculate an efficiency modifier and a flow modifier for the booster compressor 114 of FIG. 1 based on the obtained sensor data. The flight bin identifier 330 can map the sensor data, the efficiency modifier, the flow modifier, etc., to flight bin 9.

Flowcharts representative of example methods for implementing the example TEHM of FIG. 1 is shown in FIGS. 5-8. In these examples, the methods may be implemented using machine-readable instructions that comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 5-8, many other methods of implementing the example TEHM 100 can alternatively be used. For example, the order of execution of the blocks may be changed, and/or some of the blocks described may be changed, eliminated, or combined.

As mentioned above, the example methods of FIGS. 5-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM), and/or any other storage device or storage disk in which information is stored for any duration (e.g., for extended time periods, permanently, for brief instances, for temporarily buffering, and/or for caching of the information). As used herein, the term tangible computer-readable storage medium is expressly defined to include any type of computer-readable storage device and/or storage disk and to exclude propagating signals and to exclude transmission media. As used herein, "tangible computer-readable storage medium" and "tangible machine-readable storage medium" are used interchangeably. Additionally or alternatively, the example methods of FIGS. 5-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

Figure 5:
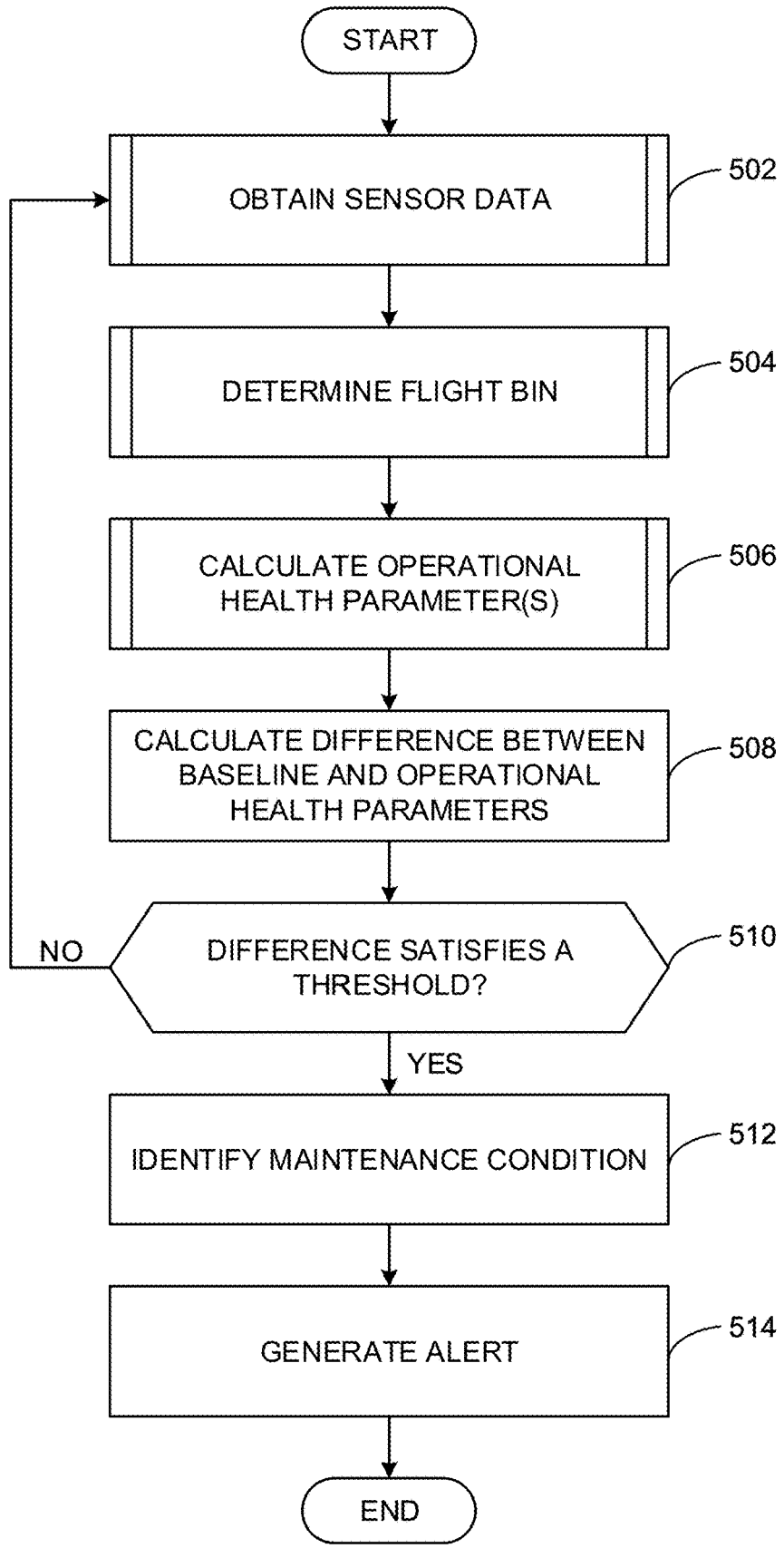
FIG. 5 is a flowchart representative of an example method that can be executed by the example turbine engine health monitor apparatus of FIG. 3 to monitor health information of the example gas turbine engine of FIG. 1.

FIG. 5 is a flowchart representative of an example method that can be performed by the example TEHM 100 of FIGS. 1-3 to calculate and analyze a health parameter of the turbine engine 102 of FIG. 1. The example method begins at block 502, at which the example TEHM 100 obtains sensor data. For example, the collection engine 300 of FIG. 3 can obtain sensor data from the sensors 144, 146 of FIGS. 1-3. At block 504, the example TEHM 100 determines a flight bin for the turbine engine 102 based on the obtained sensor data. For example, the flight bin identifier 330 can map an altitude, a Mach number, and a power level indicator (e.g., a speed of the fan section 108, a throttle power setting parameter, etc.) to a flight bin of the turbine engine 102.

At block 506, the example TEHM 100 calculates operational health parameter(s) based on determining the flight bin for the turbine engine 102. For example, the parameter calculator 310 can calculate an efficiency modifier, a flow modifier, etc., of the booster compressor 114, the high-pressure turbine 120, etc., of FIG. 1 when the engine 102 is in flight. At block 508, the example TEHM 100 calculates a difference between baseline and operational health parameters in response to calculating the operational health parameter(s). For example, the difference calculator 320 can calculate a difference between (1) a baseline value of an efficiency modifier of the booster compressor 114, and (2) an operational value of the efficiency modifier of the booster compressor 114.

At block 510, the example TEHM 100 determines whether the difference satisfies a threshold in response to calculating the difference. For example, the difference calculator 320 can determine whether the difference between (1) the baseline value of the efficiency modifier of the booster compressor 114, and (2) the operational value of the efficiency modifier of the booster compressor 114 satisfies a threshold (e.g., the difference is greater than 1.0%, 1.5%, 2.0%, etc.). If, at block 510, the example TEHM 100 determines that the difference does not satisfy the threshold, control returns to block 502 to obtain additional sensor data. If, at block 510, the example TEHM 100 determines that the difference satisfies the threshold, then, at block 512, the TEHM 100 identifies a maintenance condition. For example, the maintenance manager 350 can identify a percentage of operating life remaining for the booster compressor 114, a maintenance task for the booster compressor 114, an estimated timeline for general service on the booster compressor 114, etc. At block 514, the example TEHM 100 generates an alert triggered by identifying the maintenance condition. For example, the alert generator 360 can generate an alert indicating that the booster compressor 114 requires maintenance attention. In another example, the alert generator 360 can generate a command to be transmitted to an aircraft control system, the turbine engine 102, etc., to adjust an aircraft parameter, an engine parameter (e.g., an engine speed, a fan speed, etc.), etc., based on identifying the maintenance condition.

Figure 6:
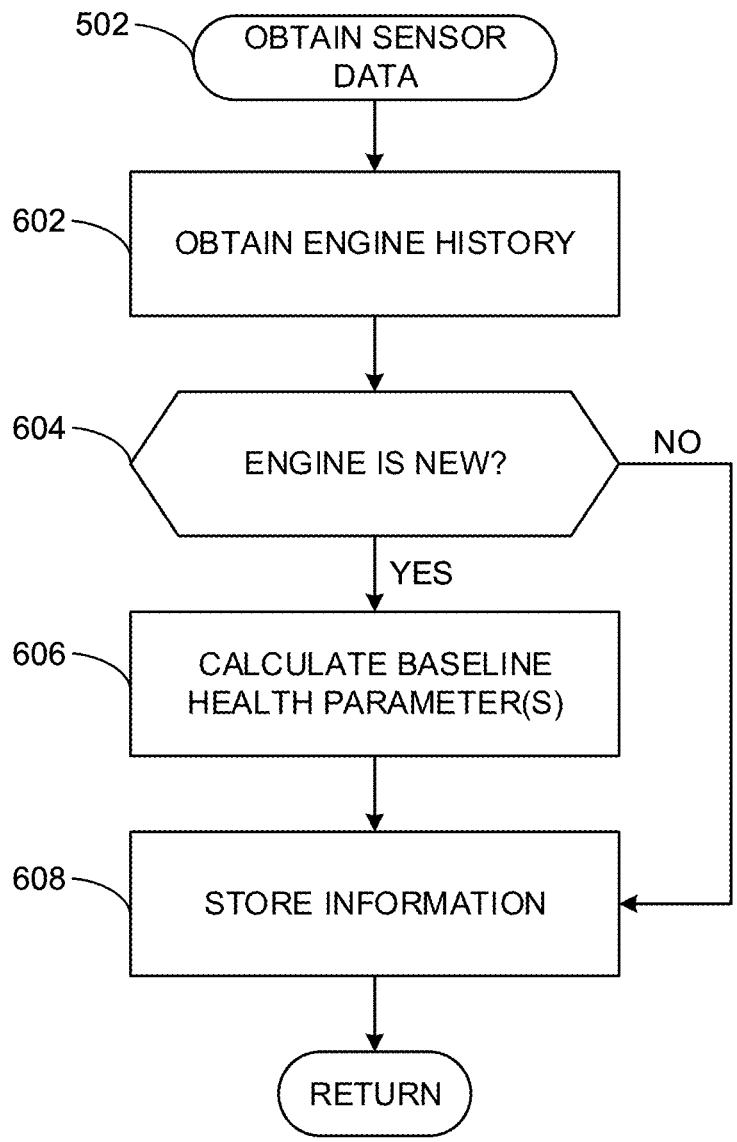
FIG. 6 is a flowchart representative of an example method that can be executed by the example turbine engine health monitor apparatus of FIG. 3 to obtain baseline information about the health status of the example gas turbine engine of FIG. 1.

Additional detail in connection with obtaining sensor data (FIG. 5, block 502) is shown in FIG. 6. FIG. 6 is a flowchart representative of an example method that can be performed by the example TEHM 100 of FIGS. 1-3 to obtain sensor data. The example method begins at block 602, at which the example TEHM 100 obtains an engine history of a turbine engine. For example, the collection engine 300 of FIG. 3 can obtain an engine history of the engine 102 of FIG. 1.

At block 604, the example TEHM 100 determines whether the engine is new based on an analysis of the obtained engine history. For example, the collection engine 300 can determine that the engine 102 is new based on a value of a first flight flag, where the value indicates that the engine 102 has not completed a first flight. If, at block 604, the example TEHM 100 determines that the engine is not new, control proceeds to block 608 to store information. If, at block 604, the example TEHM 100 determines that the engine is new, then, at block 606, the TEHM 100 calculates baseline health parameter(s). For example, the parameter calculator 310 can calculate an efficiency modifier, a flow modifier, etc., for the booster compressor 114 of FIG. 1, the high-pressure compressor 116 of FIG. 1, etc.

At block 608, the example TEHM 100 stores information in the database 370. For example, the collection engine 300 can store sensor data obtained from the sensors 144, 146 in the database 370. In another example, the parameter calculator 310 can store the calculated baseline health parameters in the database 370.

Figure 7:
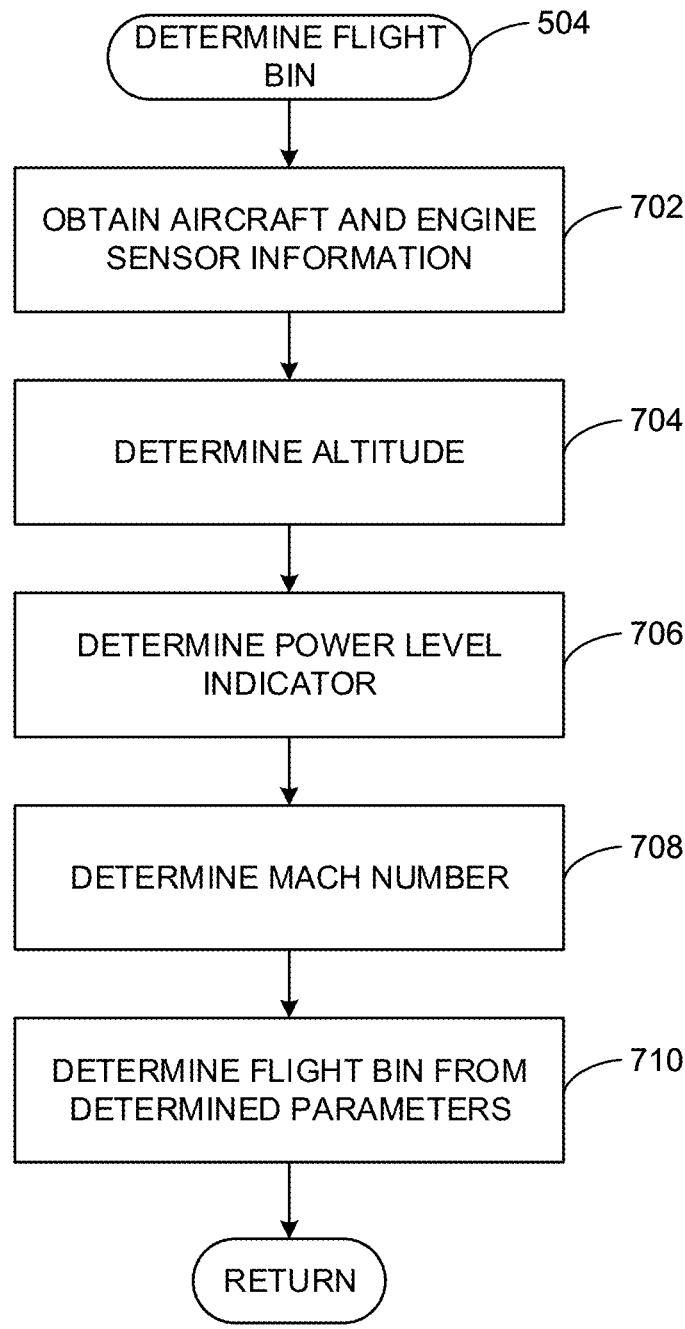
FIG. 7 is a flowchart representative of an example method that can be executed by the example turbine engine health monitor apparatus of FIG. 3 to determine a flight bin corresponding to the example gas turbine engine of FIG. 1.

Additional detail in connection with determining a flight bin (FIG. 5, block 504) is shown in FIG. 7. FIG. 7 is a flowchart representative of an example method that can be performed by the example TEHM 100 of FIGS. 1-3 to determine a flight bin of the turbine engine 102. The example method begins at block 702, at which the example TEHM 100 obtains aircraft and engine sensor information. For example, the collection engine 300 can obtain sensor data from the sensors 144, 146 of FIG. 1. In another example, the collection engine 300 can obtain sensor data from an aircraft sensor such as an altitude sensor, a Mach sensor, etc., monitoring an aircraft coupled to the engine 102 of FIG. 1. In yet another example, the collection engine 300 can obtain aircraft and engine sensor information from the database 370.

At block 704, the example TEHM 100 determines an altitude based on analyzing the obtained aircraft and engine sensor information. For example, the collection engine 300 can determine an altitude of the aircraft coupled to the engine 102 based on sensor data from an altitude sensor. At block 706, the example TEHM 100 determines a power level indicator in response to determining the altitude and analyzing the obtained sensor information. For example, the collection engine 300 can determine a power level indicator corresponding to a speed of the fan section 108, a turbine engine speed, a rotor speed, etc., of the engine 102 based on sensor data from the sensors 144, 146 of FIG. 1, etc.

At block 708, the example TEHM 100 determines a Mach number in response to determining the power level indicator. For example, the collection engine 300 can determine a Mach number of the engine 102 based on sensor data from a Mach sensor. At block 710, the example TEHM 100 determines a flight bin from determined parameters. For example, the flight bin identifier 330 can map the altitude, the power level indicator, the Mach number, etc., to a flight bin in the database 370 (e.g., a look-up table).

Figure 8:
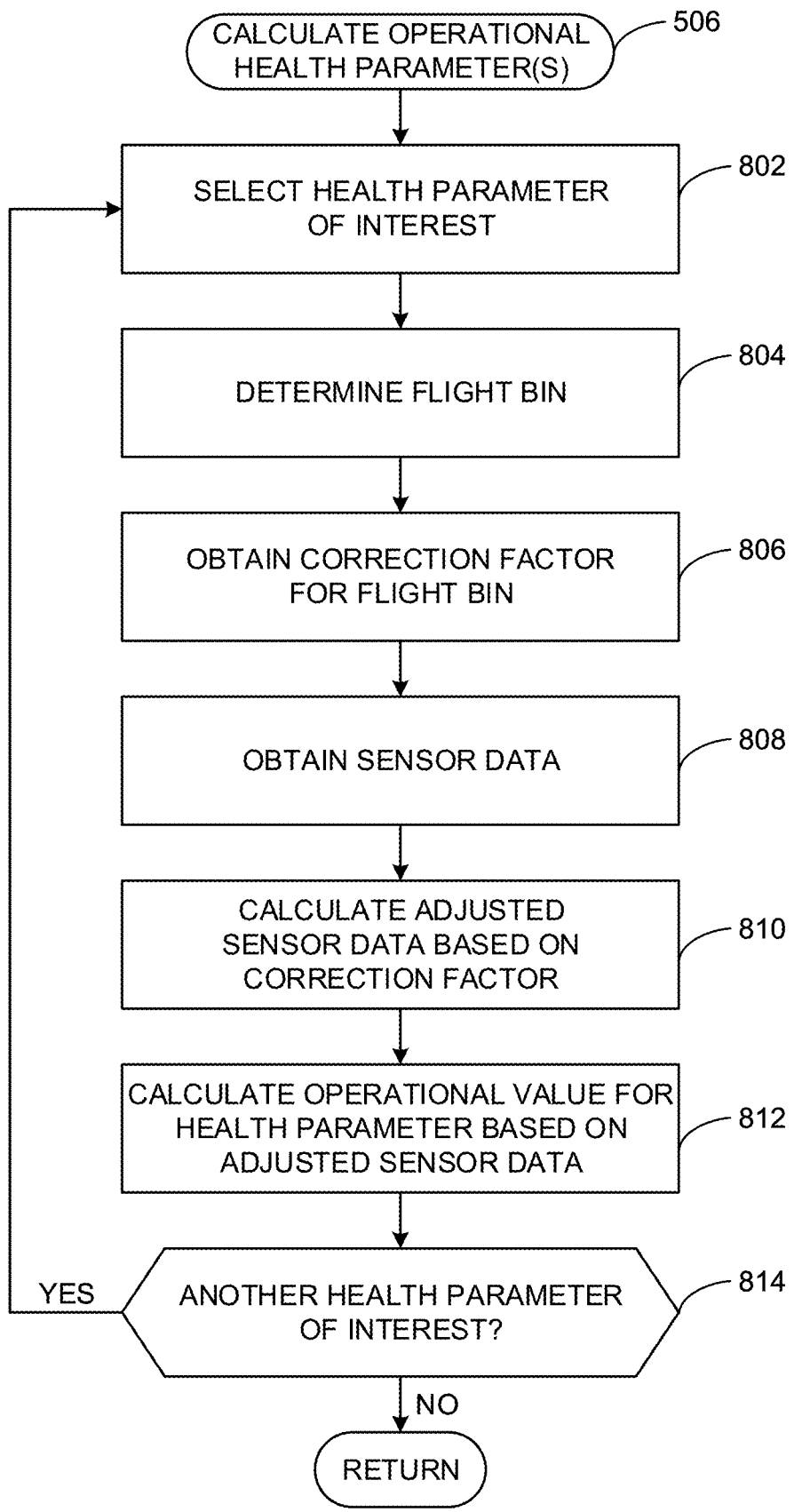
FIG. 8 is a flowchart representative of an example method that can be executed by the example turbine engine health monitor apparatus of FIG. 3 to calculate an operational health parameter of the example gas turbine engine of FIG. 1.

Additional detail in connection with calculating an operational health parameter (FIG. 5, block 506) is shown in FIG. 8. FIG. 8 is a flowchart representative of an example method that can be performed by the example TEHM 100 of FIGS. 1-3 to calculate operational health parameter(s) of a turbine engine. The example method begins at block 802, at which the example TEHM 100 selects and/or is programmed with a health parameter of interest. For example, the collection engine 300 of FIG. 1 can select an efficiency modifier of the booster compressor 114 of FIG. 1.

At block 804, the example TEHM 100 determines a flight bin. For example, the flight bin identifier 330 can determine a flight bin in accordance with the method of FIG. 7. In another example, the flight bin identifier 330 can obtain a flight bin from the database 370. At block 806, the example TEHM 100 obtains a correction factor for the flight bin in response to determining the flight bin for the turbine engine 102. For example, the parameter calculator 310 of FIG. 1 can obtain a correction factor for the flight bin from the database 370.

At block 808, the example TEHM 100 obtains sensor data in response to determining the correction factor for the flight bin of the turbine engine 102. For example, the collection engine 300 can obtain operational sensor data from the sensors 144, 146 of FIG. 1, from the database 370, etc. At block 810, the example TEHM 100 calculates adjusted sensor data based on the correction factor. For example, the parameter calculator 310 can calculate adjusted operational sensor data by offsetting the operational sensor data with the correction factor.

At block 812, the example TEHM 100 calculates an operational value for the health parameter based on the adjusted sensor data. For example, the parameter calculator 310 can calculate the efficiency modifier of the booster compressor 114 based on the adjusted operational sensor data.

At block 814, the example TEHM 100 determines whether there is another health parameter of interest by querying the database 370. For example, the collection engine 300 can query the database 370 and determine whether the database 370 returned a null index, where the null index indicates that there is not another health parameter of interest. If, at block 814, the example TEHM determines that there is another health parameter of interest, control returns to block 802 to select another health parameter of interest, otherwise the example method concludes.

Thus, certain examples enable monitoring health information of a turbine engine by determining baseline health parameters during a first flight of the turbine engine, and comparing them to calculated operational health parameters during subsequent flights of the turbine engine. In response to performing the comparison, actionable information can be gleaned such as identifying maintenance alerts, conditions, and timelines. For example, by comparing operational health parameters to baseline health parameters, certain examples enable more precise control and monitoring of the turbine engine.

Figure 9:
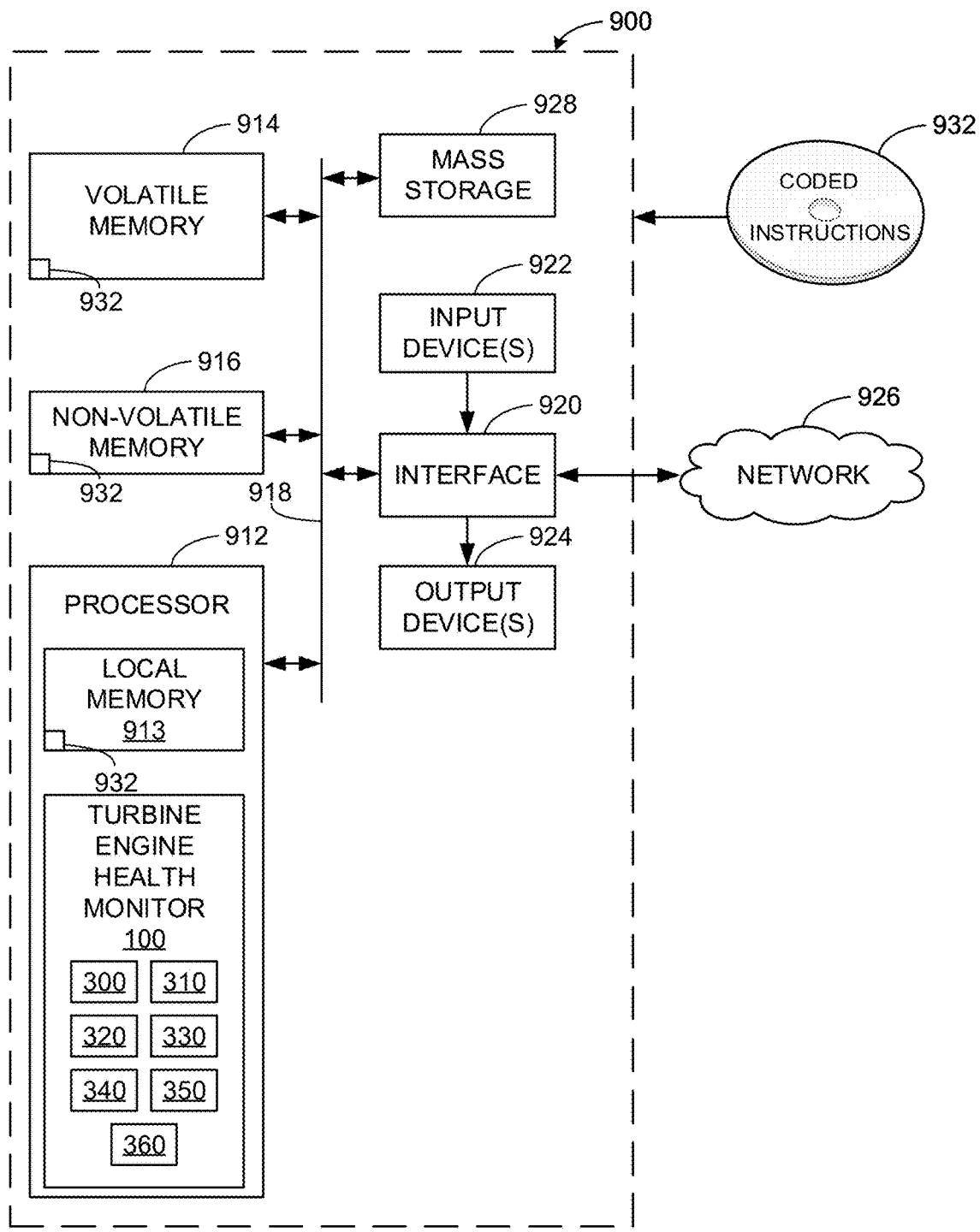
FIG. 9 is a block diagram of an example processing platform structured to execute machine-readable instructions to implement the methods of FIGS. 5-8 and/or the example turbine engine health monitor apparatus of FIG. 3.

FIG. 9 is a block diagram of an example processor platform 900 capable of executing instructions to implement the methods of FIGS. 5-8 and the example TEHM 100 of FIGS. 1-3. The processor platform 900 can be, for example, an electronic control unit (ECU), an electronic engine control (EEC) unit, a full-authority digital engine control (FADEC) unit, a server, a personal computer, or any other type of computing device or network of computing devices.

The processor platform 900 of the illustrated example includes a processor 912. The processor 912 of the illustrated example is hardware. For example, the processor 912 can be implemented by one or more integrated circuits, logic circuits, microprocessors, or controllers from any desired family or manufacturer.

The processor 912 of the illustrated example includes a local memory 913 (e.g., a cache). The processor 912 of the illustrated example executes the instructions to implement the example collection engine 300, the example parameter calculator 310, the example difference calculator 320, the example flight bin identifier 330, the example outlier identifier 340, the example maintenance manager 350, the example alert generator 360 and, more generally, the example TEHM 100. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 can be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip, or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, magnetic media, solid-state drives, compact disk drives, Blu-ray disk drives, RAID systems, and digital versatile disk (DVD) drives. The example mass storage 928 implements the example database 370.

Coded instructions 932 to implement the methods represented by the flowcharts of FIGS. 5-8 may be stored in the mass storage device 928, in the volatile memory 914, in the non-volatile memory 916, and/or on a removable tangible computer-readable storage medium such as a CD or DVD.

From the foregoing, it will be appreciated that the above disclosed methods, apparatus, and articles of manufacture implement prognostic health monitoring of a turbine engine. By implementing prognostic health monitoring, actionable information is determined to generate maintenance tasks and service intervals. Premature maintenance tasks can be eliminated and efficient streamlining of maintenance operations can be realized. The above disclosed methods, apparatus, and articles of manufacture can also eliminate or reduce modeling error and sensor bias by applying correction factors determined by conducting a calibration process. Although the figures and examples described herein sometimes refer to on-board (e.g., real-time systems on the turbine engine and/or aircraft), or off-board systems (e.g., ground-based systems), the above disclosed methods, apparatus, and articles of manufacture apply to both on-board and off-board systems.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a parameter calculator to:
determine a baseline value of a set of health parameters for a turbine engine of a vehicle based on a first set of sensor measurements to estimate an initial health of turbine engine components; and
determine an operational value of the set of health parameters based on a second set of sensor measurements to estimate an operational health of the turbine engine components; wherein for a determination of the operational value, the parameter calculator is further configured to (i) receive a sensor output and modify at least one parameter of a turbine engine model to make an output of the turbine engine model match the sensor output;
a difference calculator to calculate a difference between the baseline value and the operational value to assess a health of the turbine engine;
a database to store the first set of sensor measurements or the initial health of the turbine engine components; and
an alert generator to generate an alert when the difference satisfies a threshold, the alert including a notification to perform maintenance on the component based on the difference and the threshold.

2. The apparatus of claim 1, further including a maintenance manager to identify a condition of the turbine engine components based on the difference.

3. The apparatus of claim 1, further including a collection engine to obtain the first and the second sets of sensor measurements from at least one of a gas-path pressure sensor, gas-path temperature sensor, and a rotor speed sensor.

4. The apparatus of claim 1, wherein the first and the second sets of health parameters include an efficiency modifier or a flow modifier of a booster compressor, a high-pressure compressor, a fan, a high-pressure turbine, or a low-pressure turbine of the vehicle.

5. The apparatus of claim 1, wherein the vehicle is an aircraft.

6. The apparatus of claim 5, further including a flight bin identifier to determine a flight bin of the aircraft, where the flight bin is based on an altitude, a Mach number, or a power level indicator of the aircraft or the turbine engine.

7. A method comprising:
determining, by executing an instruction with a processor, a baseline value of a set of health parameters for a turbine engine of a vehicle based on a first set of sensor measurements to estimate an initial health of turbine engine components;
determining, by executing an instruction with the processor, an operational value of the set of health parameters based on a second set of sensor measurements to estimate an operational health of the turbine engine components; wherein determining the operational value includes receiving by the processor, a sensor output, and modifying, by the processor, at least one parameter of a turbine engine model to make an output of the turbine engine model match the sensor output;

calculating, by executing an instruction with the processor, a difference between the baseline value and the operational value to assess a health of the turbine engine;

storing, by executing an instruction with the processor, the first set of sensor measurements or the initial health of the turbine engine components; and generating, by executing an instruction with the processor, an alert when the difference satisfies a threshold, the alert including a notification to perform maintenance on the component based on the difference and the threshold.

8. The method of claim 7, further including identifying a condition of the turbine engine components based on the difference.

9. The method of claim 7, further including obtaining the first and the second sets of sensor measurements from at least one of a gas-path pressure sensor, gas-path temperature sensor, and a rotor speed sensor.

10. The method of claim 7, wherein the first and the second sets of health parameters include an efficiency modifier or a flow modifier of a booster compressor, a high-pressure compressor, a fan, a high-pressure turbine, or a low-pressure turbine of the vehicle.

11. The method of claim 7, wherein the vehicle is an aircraft.

12. The method of claim 11, further including determining a flight bin of the aircraft.

13. The method of claim 12, wherein the flight bin is based on an altitude, a Mach number, or a power level indicator of the aircraft or the turbine engine.

14. A tangible computer-readable storage medium comprising instructions which, when executed, cause a machine to at least:

determine a baseline value of a set of health parameters for a turbine engine of a vehicle based on a first set of sensor measurements to estimate an initial health of turbine engine components;

determine an operational value of the set of health parameters based on a second set of sensor measurements to estimate an operational health of the turbine engine components; wherein a determination of the operational value includes:

receiving a sensor output; and modifying at least one parameter of a turbine engine model to make an output of the turbine engine model match the sensor output;

calculate a difference between the baseline value and the operational value to assess a health of the turbine engine;

store the first set of sensor measurements or the initial health of the turbine engine components; and generate an alert when the difference satisfies a threshold, the alert including a notification to perform maintenance on the component based on the difference and the threshold.

15. The tangible computer-readable storage medium of claim 14, further including instructions which when executed, cause the machine to at least identify a condition of the turbine engine components based on the difference.

16. The tangible computer-readable storage medium of claim 14, further including instructions which when executed, cause the machine to at least obtain the first and the second sets of sensor measurements from at least one of a gas-path pressure sensor, gas-path temperature sensor, and a rotor speed sensor.

17. The tangible computer-readable storage medium of claim 14, wherein the first and the second sets of health parameters include an efficiency modifier or a flow modifier of a booster compressor, a high-pressure compressor, a fan, a high-pressure turbine, or a low-pressure turbine of the vehicle.

18. The tangible computer-readable storage medium of claim 14, wherein the vehicle is an aircraft.

19. The tangible computer-readable storage medium of claim 18, further including instructions which when executed, cause the machine to at least determine a flight bin of the aircraft.

20. The tangible computer-readable storage medium of claim 19, wherein the flight bin is based on an altitude, a Mach number, or a power level indicator of the aircraft or the turbine engine.

* * * * *